US 6,273,574 B1

(12) United States Patent
Phillips

(10) Patent No.: US 6,273,574 B1
(45) Date of Patent: Aug. 14, 2001

(54) MOTORIZED SAFETY BACKUP MIRROR SYSTEM

(76) Inventor: Edward J. Phillips, 915 E. 68th, Kansas City, MO (US) 64131

( * ) Notice: Subject to any disclaimer, the term of this patent is extended or adjusted under 35 U.S.C. 154(b) by 0 days.

(21) Appl. No.: 09/545,753

(22) Filed: Apr. 10, 2000

Related U.S. Application Data

(63) Continuation of application No. 09/108,652, filed on Jul. 1, 1998, now abandoned.

(51) Int. Cl.$^7$ .............................. G02B 5/08; G02B 7/182
(52) U.S. Cl. ........................................... 359/841; 359/877
(58) Field of Search ................................... 359/841, 843, 359/844, 871, 872, 877

(56) References Cited

U.S. PATENT DOCUMENTS 5,712,736 * 1/1998 Kogita et al. .................... 359/841

OTHER PUBLICATIONS

"Teamster" magazine, May/Jun. 1997, p. 3.

* cited by examiner

Primary Examiner—Cassandra Spyrou
Assistant Examiner—Jared Treas
(74) Attorney, Agent, or Firm—Chase & Yakimo, L.C.

(57) ABSTRACT

A safety mirror system includes a housing mounted to a rear surface of a truck, the housing including an electrically operated drive train therein. A bracket includes a first end coupled to the drive train and a second end having the mirror mounted thereto. The drive train includes a motor which is operable by a driver operable switch in the electrical circuit. Upon switch operation the drive train will pivot the mirror between a position in which the mirror is behind the truck to a position at which the mirror is displaced from the side of the truck and angled towards the blind spot behind the rear of the truck. At this displaced position the driver can view the image of the dead space in the displaced rear mirror. The displaced mirror can be pivoted to a storage position adjacent the truck when not in use. Stop lugs within the drive train physically preclude movement of the mirror beyond the storage or displaced positions as well as cease current delivery to the drive train at these positions.

1 Claim, 2 Drawing Sheets

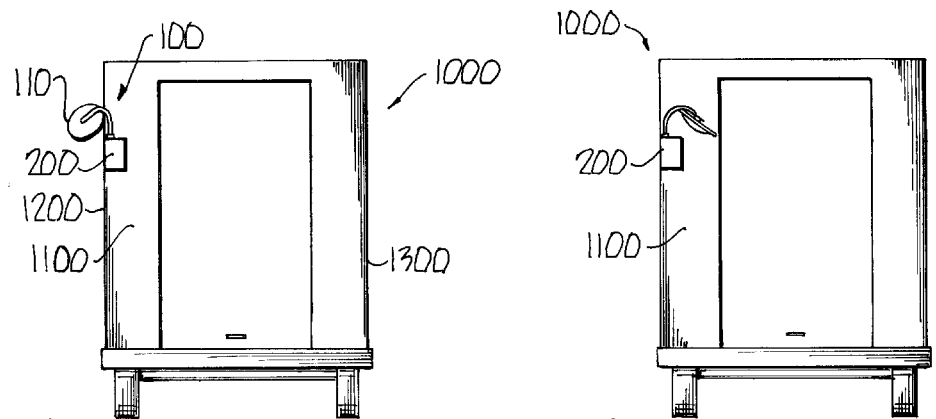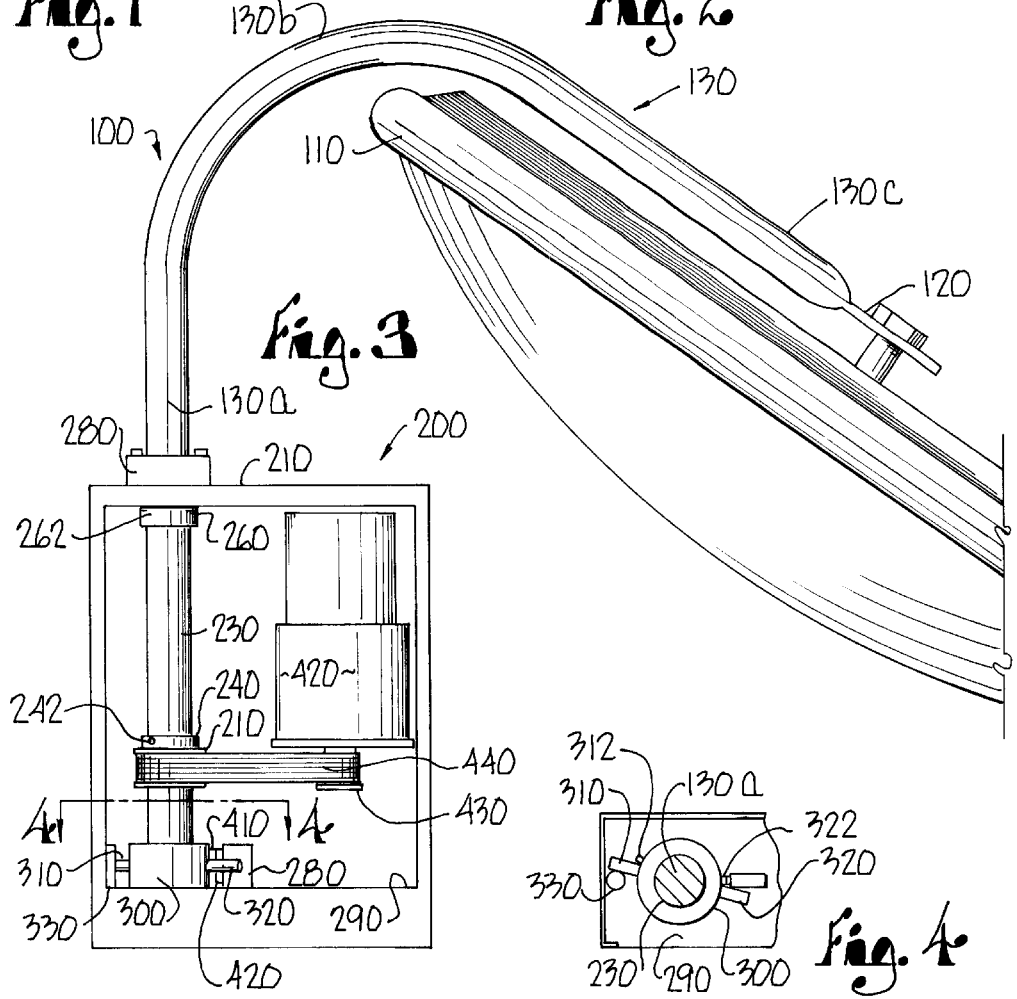

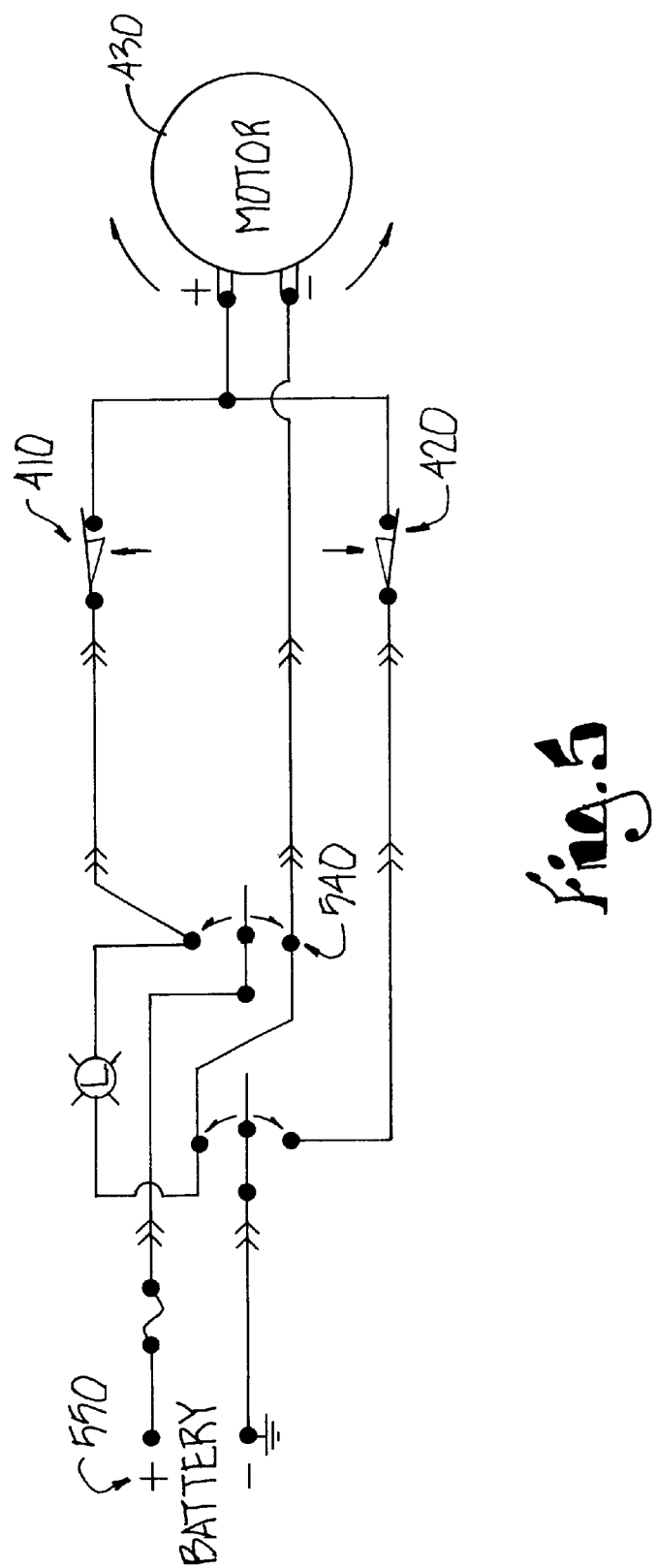

MOTORIZED SAFETY BACKUP MIRROR SYSTEM

CROSS REFERENCE

This application is a continuation application of Ser. No. 09/108,652 filed Jul. 1, 1998, now abandoned.

BACKGROUND OF THE INVENTION

This invention relates to a safety mirror and, more particularly, to a mirror system designed to allow a remote driver to selectably move a rearwardly mounted mirror between functional and storage positions, the mirror at a functional position presenting the driver a view of the blind spot at the rear of a truck.

It is known that the area immediately to the rear of a truck produces a blind spot which cannot be viewed by the conventional side view mirrors of a truck as the line of sight of the viewing angle is limited. In some cases this blind spot has lead to dire results as trucks have backed up and injured, if not killed, persons standing in this blind spot.

One response to this problem has been to mount a fixed mirror to the rear of the truck so as to reflect images of objects located in this blind spot for viewing by the driver. The mirror extends beyond the side walls of the truck so that the driver can view the reflected image via the conventional side view mirror.

Problems have arisen with this fixed mirror as the lateral extension of the mirror beyond the side of the truck renders the mirror capable of being damaged by contact with other objects, e.g., the frame of a garage door entry, passing trucks, etc. Also, this fixed mirror extension precludes a fleet of trucks from being parked in a close side-by-side relationship which increases the parking space needed for a truck fleet.

In response thereto I have invented a motorized safety backup mirror system which includes a housing with a mirror pivotally mounted to the rear of a truck, the mirror being movable by a drive train operable by a remote driver between functional and storage positions. In the functional position the mirror extends beyond the side of the truck and towards the blind spot so as to reflect the image of this blind spot at the rear of the truck. At this functional position the reflection of the dead space in the rear mirror may be either directly viewed by the driver or via the conventional side view mirror. The rear mirror is pivotal by driver operation of the drive train to a position behind the truck when the mirror need not be utilized. Thus, the rear mirror need not always laterally extend from the truck so as to avoid the above-discussed problems found with a fixed mirror.

It is therefor a general object of this invention to provide a safety mirror system designed to be maneuvered between functional and storage positions.

A further object of this invention is to provide a mirror system, as aforesaid, which can be operated by a remote driver.

Still another object of this invention is to provide a mirror system, as aforesaid, which reflects an image of the blind spot found behind a vehicle for viewing by a vehicle driver.

Another particular object of this invention is to provide a mirror system, as aforesaid, the blind spot reflected in the mirror for viewing.

A still further particular object of this invention is to provide a mirror system, as aforesaid, which couples the mirror to a motor driven drive assembly for operator movement of the mirror between functional and storage positions.

Another particular object of this invention is to provide a mirror system, as aforesaid, the drive assembly designed to preclude the mirror from moving beyond its functional and/or storage positions.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 1 is a rear view of a truck with the mirror installed thereon, the mirror being at a functional position;

FIG. 2 is a rear view of the truck of FIG. 1 with the mirror being at a storage position;

FIG. 3 is a front view of the mirror of FIG. 2, on an enlarged scale, with a portion of the drive assembly housing removed to show the drive assembly therein;

FIG. 4 is a view taken along line 4—4 found in FIG. 3; and

FIG. 5 is a view of one form of circuitry for energizing the motor of the drive assembly.

DESCRIPTION OF THE PREFERRED EMBODIMENT

Turning more particularly to the drawings, FIG. 1 shows a rear view of a truck 1000 having a rear wall 1100 and side walls 1200, 1300. It is understood that a cab (not shown) is at the front of the truck 1000 and may have a conventional side view mirror at least on the driver side thereof. Although one form of a truck has been shown it is understood that the invention need not be limited thereto.

Mounted to the rear wall 1100 of the truck 1000 is the safety system 100. System 100 comprises a mirror 110 mounted to a bracket 120 extending from the end of a bracket arm 130. Bracket arm 130 includes first and second generally straight shaft portions 130a, 130c connected by an intermediate curved portion 130b such that shaft portions 130a, 130c are angled relative to each other.

The system 100 further includes a housing 200 having a top wall 210 with an aperture therein allowing for insertion of the shaft portion 130a of bracket arm 130 therethrough. Located within the housing is a drive train, including a drive shaft 230 for receiving the shaft 130a therein. A first collar 240 surrounds shaft 230 and includes a set screw 242 which extends into shaft 230 and into a bearing relationship against shaft 130a positioned within drive shaft 230. A second similar collar 260 and set screw 262 combination is found at the top of shaft 230 to further couple shaft 130a to shaft 230. Thus, rotation of shaft 230 will also rotate shaft 130a. A bearing 280 is found atop wall 210 and surrounds shaft 130a at its entry through the top wall 210 of housing 200.

At the bottom of shaft 230 is a base 300 rotatable with shaft 230. The base has stop lugs 310, 320 radially extending therefrom. These stop lugs 310, 320 are designed to engage a stop post 330 during base 300 rotation which upwardly extends from the bottom wall 290 of housing 200. Also extending from the base 300 are lugs 312, 322 which project from the base and are located adjacent the respective stop lugs 310, 320. Stop lug 322 is positioned higher on the base 300 than stop lug 312.

Also found along the bottom wall 290 is a post 280 having a first upper microswitch 410 and a second lower microswitch 420 extending therefrom. Microswitches 410, 420 are a part of the FIG. 5 circuit as to be described. Further located within the housing 200 is a DC motor 420 also incorporated within the FIG. 5 circuit. Extending from the motor 420 is a shaft 430. Belt 440 extends between shaft 430 and a pulley 210 configuration extending about shaft 230. Accordingly, rotation of motor shaft 430 will rotate shaft 230 by means of the link belt 440 extending therebetween.

FIG. 5 shows one form of circuitry for use with the system. The circuitry is powered by the vehicle battery 550 which is wired as shown to the motor 420. A double throw switch 540 positioned in the vehicle cab directs current to the motor 420.

Accordingly, if the mirror is at the FIG. 1 position, a throw of switch 540 will close the circuit such that the motor 420 of the drive train rotates the shaft 430 in a first direction. Shaft rotation 430 is linked to shaft 230 by belt 440 such that shaft 230 rotates the bracket arm 130 to move the attached mirror 110 from a FIG. 1 position to its FIG. 2 storage position. During such rotation the stop lug 310 will engage the stop post 330 (FIG. 4) to mechanically prevent further rotation of the base in the counterclockwise direction. At such a position the upper lug 322 engages the upper microswitch 410 extending from column 280 which opens the circuit so as to cease delivery of the current to the motor 430. Thus, rotation of the shafts 230, 130a and mirror 110 coupled thereto beyond the FIG. 2 position is precluded. Concurrently, a light 542 in circuit will be off indicative of the retracted storage position.

To move the mirror to the FIG. 1 position the switch 540 is again thrown causing the polarity of motor 430 to reverse. Thus, the shafts 430, 230, 130a are rotated in an opposite direction to move mirror 110 to the FIG. 1 position. At this position a light 542 in the cab will go on indicating to the driver the mirror is in the FIG. 1 backup position. During this rotation stop lug 320 will contact stop post 330. Concurrently, the lower lug 312 will engage the lower microswitch 420 to cease current delivery. Thus, mirror 110 will not be moved beyond its functional FIG. 1 position. At this FIG. 1 position the mirror 110 laterally extends beyond the side of the truck 1000 and is angled so as to reflect the image of the blind spot behind the truck including any objects therein. The mirror 110 can either be directly viewed by the driver or via the driver's side view mirror.

Accordingly, the system 100 allows the remote driver, as seated in the cab, to position the mirror in a FIG. 1 functional position such that the driver can view the blind spot in the mirror 110. If the mirror 110 need not be used, such as if the driver is being assisted in vehicle back up or the driver needs to maneuver the vehicle through tight spaces, the mirror can be easily moved to its FIG. 2 storage position by throwing switch 540. In either case the stop lugs 310, 320/stop post 330 combination extending from the base 300 precludes movement of the mirror beyond the FIG. 1 or FIG. 2 positions. Concurrently, the lug 312, 322/microswitch 410, 420 combination assures that delivery of current to the motor 420 ceases when the mirror reaches these desired FIG. 1 or FIG. 2 positions. Accordingly, my invention solves the prior art problems while providing advantages not found in the prior art.

It is to be understood that while a certain form of this invention has been illustrated and described, it is not limited thereto except insofar as such limitations are included in the following claims and allowable functional equivalents thereof.

What is claimed is:

1. In combination with a motor vehicle having a vertically extending rear surface, a mirror system for reflecting an image of an area located behind the vehicle comprising:

a generally J-shaped arm having inner and outer ends;

a mirror mounted to said outer end of said arm;

a housing mounted on an upper portion of said rear surface of said vehicle;

a drive assembly within said housing having a motor responsive to an electrical current, a drive shaft operable by said motor, a driven shaft spaced from said drive shaft and coupled to said inner end of said arm, and a drive belt extending between and coupled with said drive shaft and said driven shaft;

a circuit for providing said electrical current to energize said motor in a manner to rotate said drive shaft and said driven shaft in first or second opposed directions to move said arm coupled thereto between a first position where said mirror reflects an image of an area located behind said vehicle for view by a vehicle driver, and a second position where said mirror is at a storage position displaced from said first position and toward said rear surface of said vehicle, said first position and said second position presenting a movement zone therebetween;

a mechanical movement limiter for limiting movement of said arm beyond said first and second positions to prevent said mirror from contacting the vehicle, having first and second stop lugs extending from said driven shaft, a stop post in said housing, said first stop lug engaging said stop post at said first position to preclude further rotation of said driven shaft in said first direction, said second stop lug engaging said stop post at said second position to preclude further rotation of said driven shaft in said second direction; and an electrical movement limiter for limiting movement of said arm beyond said first and second positions to prevent said mirror from contacting the vehicle, having first and second switches in said housing and incorporated in said circuit, said first switch being in a closed position to deliver current to said motor during said rotation of said drive shaft in said first direction, a first switch lug extending from said driven shaft to contact said first switch at said first position and open said first switch to cease said current delivery to said motor, said second switch being in a closed position to deliver current to said motor during said rotation of said drive shaft in said second direction, and a second switch lug extending from said driven shaft to contact said second switch at said second position and open said second switch to cease current delivery to said motor, said drive belt allowing slippage between said drive and driven shafts when said arm is moved between said first position and said second position for minimizing damage to the mirror system in the event of contact with an object within said movement zone.

* * * * *